United States Patent
Neufelder et al.

(10) Patent No.: US 8,951,130 B2
(45) Date of Patent: Feb. 10, 2015

(54) FLEXIBLE SHAFT ASSEMBLIES

(75) Inventors: Mark E. Neufelder, Fort Branch, IN (US); Tracy R. Nelson, Carmi, IL (US); William L. Huddleston, Boonville, IN (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 831 days.

(21) Appl. No.: 13/071,875

(22) Filed: Mar. 25, 2011

(65) Prior Publication Data

US 2012/0240847 A1    Sep. 27, 2012

(51) Int. Cl.
| | | |
|---|---|---|
| F16D 3/64 | (2006.01) | |
| F16D 3/02 | (2006.01) | |
| B25J 9/10 | (2006.01) | |
| F16C 1/08 | (2006.01) | |
| B05B 13/04 | (2006.01) | |

(52) U.S. Cl.
CPC ... *F16D 3/02* (2013.01); *B25J 9/10* (2013.01); *F16C 1/08* (2013.01); *B05B 13/0431* (2013.01); *F16C 2322/59* (2013.01); *Y10S 901/43* (2013.01)
USPC ............... 464/73; 464/170; 464/182; 901/43; 417/359

(58) Field of Classification Search
USPC .................... 464/73–76, 127, 170, 180, 182; 384/226–228, 244, 275; 417/359; 901/43
See application file for complete search history.

(56) References Cited

U.S. PATENT DOCUMENTS

| | | | |
|---|---|---|---|
| 1,893,593 A * | 1/1933 | Oechsle | .................... 464/170 X |
| 3,668,892 A * | 6/1972 | Alsch | .............................. 464/73 |
| 3,934,428 A | 1/1976 | Hedin | |
| 4,198,832 A | 4/1980 | Pauli | |
| 4,541,160 A * | 9/1985 | Roberts | ..................... 464/182 X |
| 5,102,308 A | 4/1992 | Bordelon | |
| 5,267,903 A | 12/1993 | Kuribayashi | |
| 5,284,455 A | 2/1994 | Kuribayashi | |
| 5,890,656 A | 4/1999 | Fuhlbrigge | |
| 6,039,545 A | 3/2000 | Cauthen | |
| 6,328,799 B1 | 12/2001 | Inoue et al. | |
| 6,857,860 B1 | 2/2005 | Zimmermann et al. | |
| 6,868,774 B2 | 3/2005 | McCollough et al. | |
| 7,309,218 B1 | 12/2007 | Lewis et al. | |
| 2009/0250003 A1 | 10/2009 | Umezawa et al. | |

\* cited by examiner

*Primary Examiner* — Gregory Binda
(74) *Attorney, Agent, or Firm* — Dinsmore & Shohl LLP

(57) ABSTRACT

A flexible shaft assembly that transfers torque from a driver to a driven member includes a stub shaft that includes an elongated shaft axis, where the stub shaft couples to the driver, and a flexible coupling that includes a first hub that is adjustably connected to a second hub, where the second hub is coupled to the driven member and includes an external cylindrical interface. The flexible shaft assembly further includes a spacer that includes a spacer body, a shaft clearance hole that passes through the spacer body having a central axis extending therethrough, and a cylindrical guide surface concentric with the shaft clearance hole, where the external cylindrical interface of the flexible coupling is located inside the cylindrical guide surface, and the first hub adjusts relative to the second hub when the elongated shaft axis is out of alignment with the central axis of the shaft clearance hole.

20 Claims, 6 Drawing Sheets

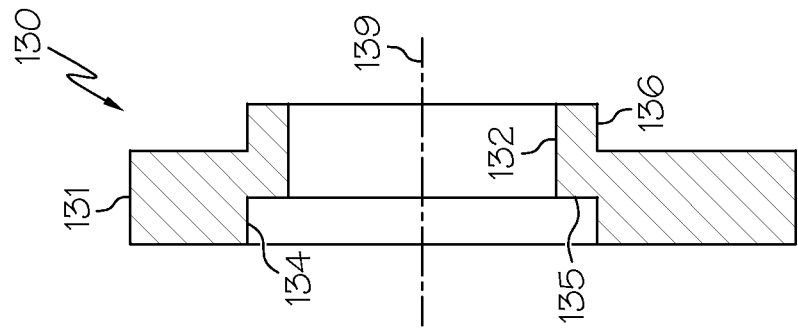
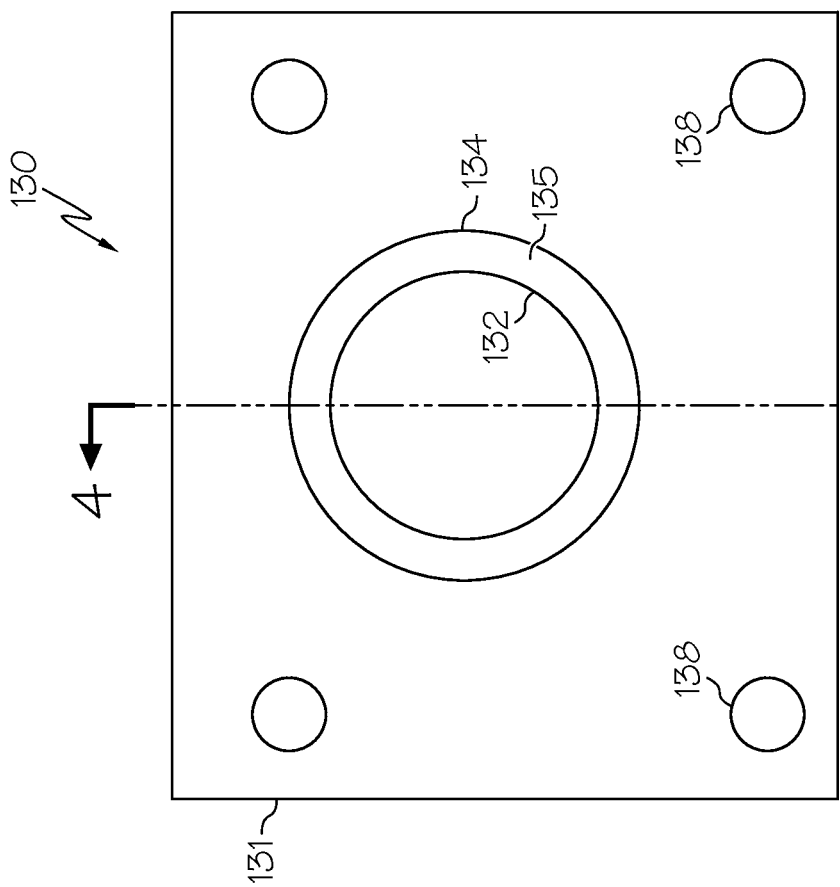
FIG. 4
FIG. 3

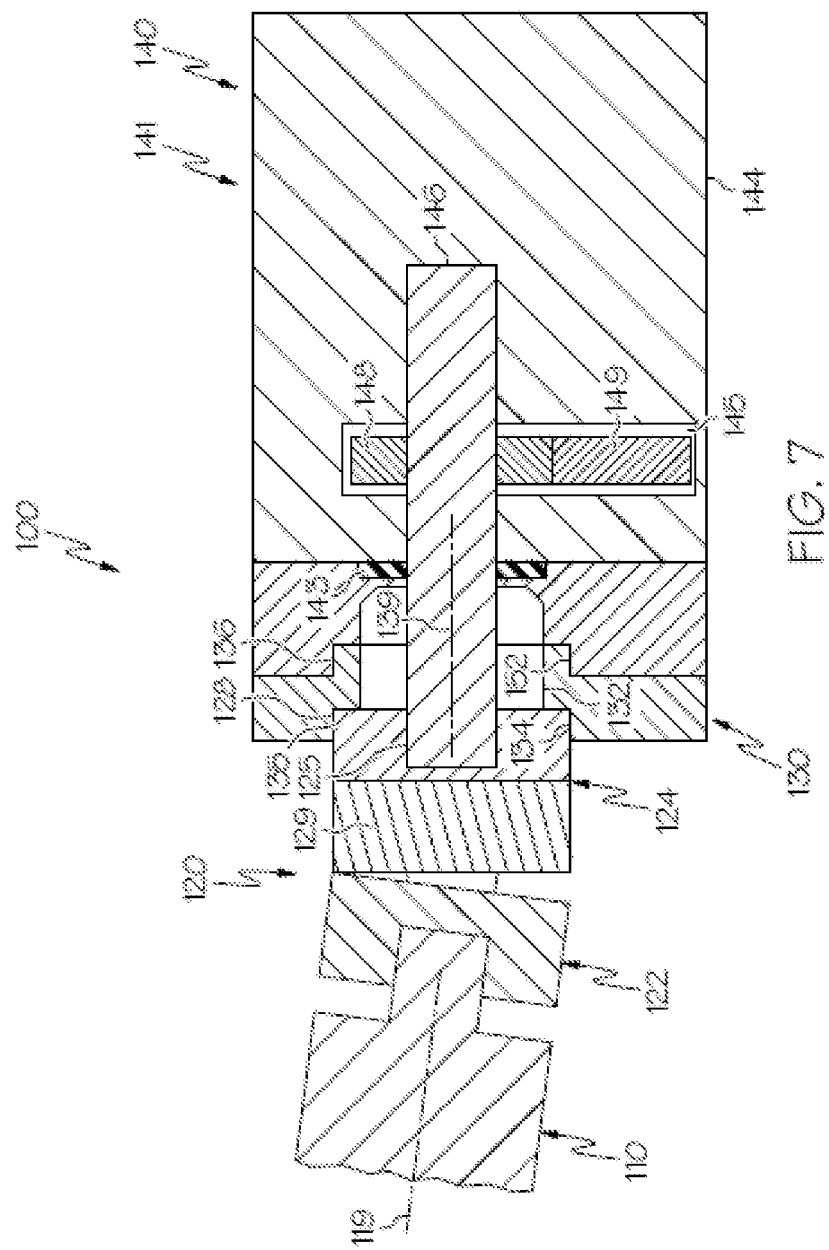

FLEXIBLE SHAFT ASSEMBLIES

TECHNICAL FIELD

The present specification generally relates to flexible shaft assemblies and, more specifically, to flexible shaft assemblies for paint delivery systems.

BACKGROUND

Hydraulic pumps connected to electric motors are used in a variety of applications and industries to pressurize liquids for delivery. Typically, liquid enters the hydraulic pump, the liquid is pressurized by rotating components of the hydraulic pump, and the fluid exits the hydraulic pump for dispensing at a remote location. Depending on the type of hydraulic pump used for a particular application, the rotating components of the hydraulic pump are held in close clearance relative to the surrounding static components.

Electric motors may be connected to hydraulic pumps using rigid drive shafts. The rigid drive shafts transmit torque from the electric motors to the hydraulic pumps. However, if the drive shafts are misaligned from the input shafts of the hydraulic pumps, the misalignment may transmit unwanted force to the hydraulic pumps and may cause wear and premature failure of the internal components of the hydraulic pumps. Further, rigid drive shafts also transmit force to the hydraulic pumps due to axial float of the motors. Accordingly, flexible shaft assemblies that transmit torque from electric motors to hydraulic pumps and limit unwanted forces are required.

SUMMARY

In one embodiment, a flexible shaft assembly that couples a driver to a driven member for transferring torque to the driven member includes a stub shaft that includes an elongated shaft portion having an elongated shaft axis, a first stub shaft interface located at a first end of the shaft portion and a second stub shaft interface located at a second end of the shaft portion, where the first stub shaft interface couples to the driver and the second stub shaft interface is coupled to a flexible coupling. The flexible shaft assembly also includes a flexible coupling that includes a first hub that is adjustably connected to a second hub, where the first hub includes a first coupling interface coupled to the second stub shaft interface of the stub shaft and the second hub includes a second coupling interface that couples to the driven member and an external cylindrical interface. The flexible shaft assembly further includes a spacer that includes a spacer body, a shaft clearance hole that passes through the spacer body having a central axis extending therethrough, and a cylindrical guide surface concentric with the shaft clearance hole. At least a portion of the external cylindrical interface of the flexible coupling is located inside the cylindrical guide surface of the spacer, and the first hub of the flexible coupling adjusts relative to the second hub of the flexible coupling when the elongated shaft axis of the stub shaft is out of alignment with the central axis of the shaft clearance hole.

In another embodiment, a liquid metering system including a motor that includes an output shaft, a stub shaft coupled to the output shaft of the motor, and a flexible coupling that includes a first hub that is adjustably connected to a second hub, where the first hub is coupled to the stub shaft and the second hub includes an external cylindrical surface. The liquid metering system also includes a hydraulic pump that includes an input shaft, a liquid inlet, and a liquid outlet, where the second hub of the flexible coupling is coupled to the input shaft of the hydraulic pump. The liquid metering system further includes a spacer statically mounted relative to the hydraulic pump, where the spacer includes a spacer body, a shaft clearance hole that passes through the spacer body, and a cylindrical guide surface concentric with the shaft clearance hole, where at least a portion of the external cylindrical surface of the second hub of the flexible coupling is surrounded by the cylindrical guide surface of the spacer. When the motor causes the input shaft of the hydraulic pump to rotate, the hydraulic pump pressurizes liquid from the liquid inlet and forces the liquid coating out of the liquid outlet.

In yet another embodiment, a robotic paint dispensing apparatus includes a multi-axis robot that includes at least one repositionable arm, a motor coupled to the at least one repositionable arm of the multi-axis robot, where the motor includes an output shaft. The robot paint dispensing apparatus also includes a stub shaft that includes an elongated shaft portion including a first stub shaft interface located at a first end of the shaft portion and a second stub shaft interface located at a second end of the shaft portion, where the first stub shaft interface is coupled to the output shaft of the motor. The robot paint dispensing apparatus further includes a flexible coupling that include a first coupling interface located along a first hub, a second coupling interface located along a second hub, and an external cylindrical interface extending along the second hub, where the first coupling interface is coupled to the second stub shaft interface of the stub shaft. The robot paint dispensing apparatus further includes a hydraulic pump coupled to the at least one repositionable arm of the multi-axis robot, where the hydraulic pump includes a pump housing and an input shaft protruding from the pump housing, wherein the input shaft of the hydraulic pump is coupled to the second coupling interface of the flexible coupling, and a spacer that includes a spacer body, a shaft clearance hole that passes through the spacer body, and a cylindrical guide surface concentric with the shaft clearance hole, where the spacer is statically mounted such that cylindrical guide surface is aligned with the input shaft of the hydraulic pump and at least a portion of the external cylindrical interface of the flexible coupling is located inside the cylindrical guide surface of the spacer.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 depicts a front view of a spacer for a flexible shaft assembly according to one or more embodiments shown and described herein;

FIG. 4 depicts a sectional view of the spacer along line 4-4 of FIG. 3;

FIG. 7 depicts a sectional view of a flexible shaft assembly according to one or more embodiments shown and described herein.

DETAILED DESCRIPTION

Embodiments of the present disclosure generally relate to flexible shaft assemblies that convey torque that is applied at one end of the flexible shaft assembly to the opposite end of the flexible shaft assembly. The flexible shaft assembly is compliant in multiple directions and absorbs at least some vibration and movement instead of transmitting the vibration and movement from a driver to a driven member. The flexible shaft assemblies include a stub shaft, a flexible coupling attached to both the stub shaft and an input shaft of the driven member, and a statically mounted spacer. The spacer includes a cylindrical guide surface that is aligned with the input shaft of the driven member, and is configured to prevent the driver from introducing force other than torque to the input shaft of the driven member.

Figure 1:
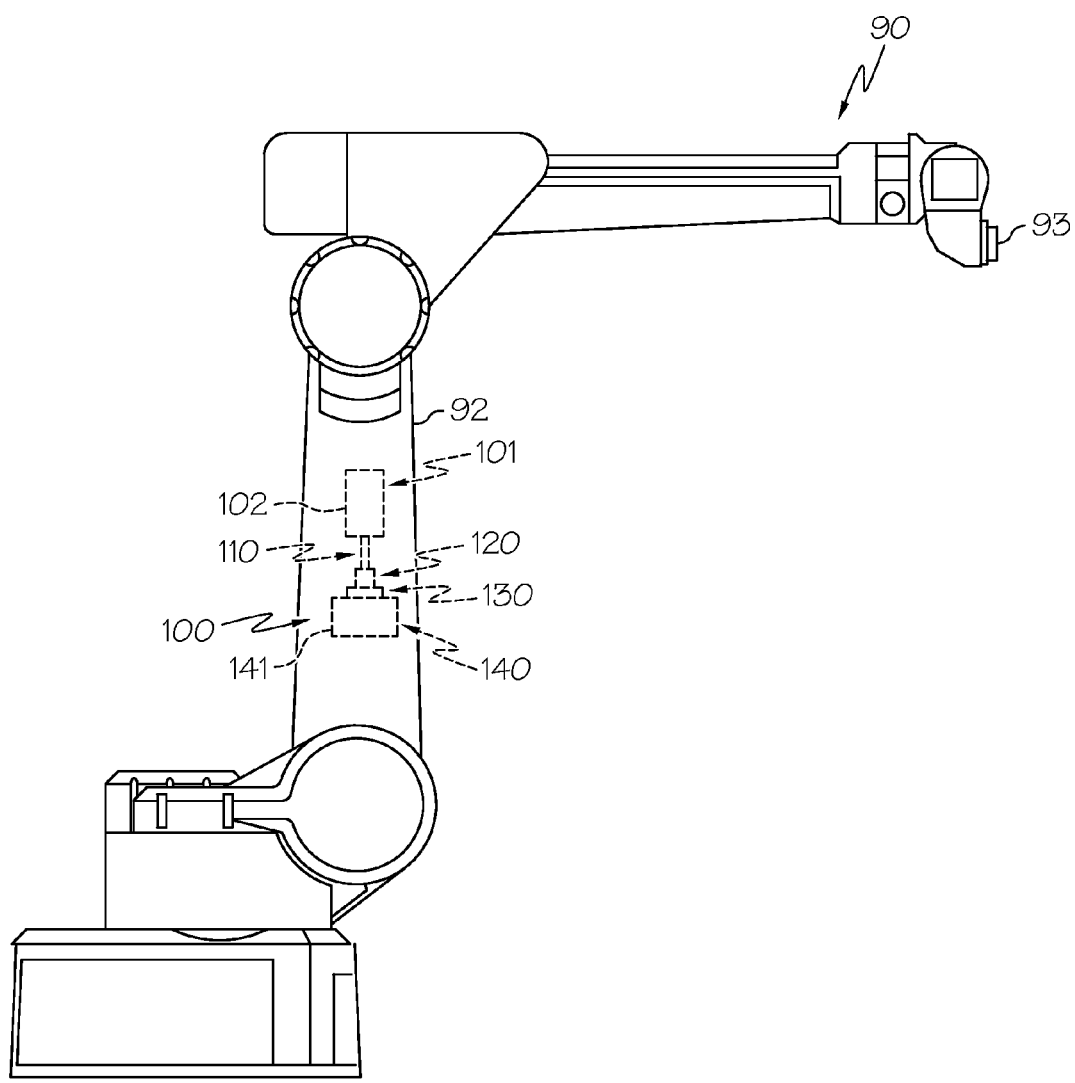
FIG. 1 depicts a side view of a paint robot according to one or more embodiments shown and described herein.

One embodiment of a flexible shaft assembly 100 is depicted in FIG. 1 in relation to a paint robot 90. In this embodiment, the flexible shaft assembly 100 connects the driver 101, here a motor 102, with the driven member 140, here a hydraulic pump 141, such that the motor 102 provides torque to actuate the hydraulic pump 141, which pressurizes liquid paint for delivery to a remotely located paint spray head 93. In one embodiment, the flexible shaft assembly 100, the driver 101, and the driven member 140 may be attached as an assembly to a movable robotic arm 92 or other moveable element of the paint robot 90 for movement therewith. In other embodiments, the flexible shaft assembly 100, the driver 101, and the driven member 140 may be attached as an assembly to a stationary element of the paint robot 90.

Figure 2:
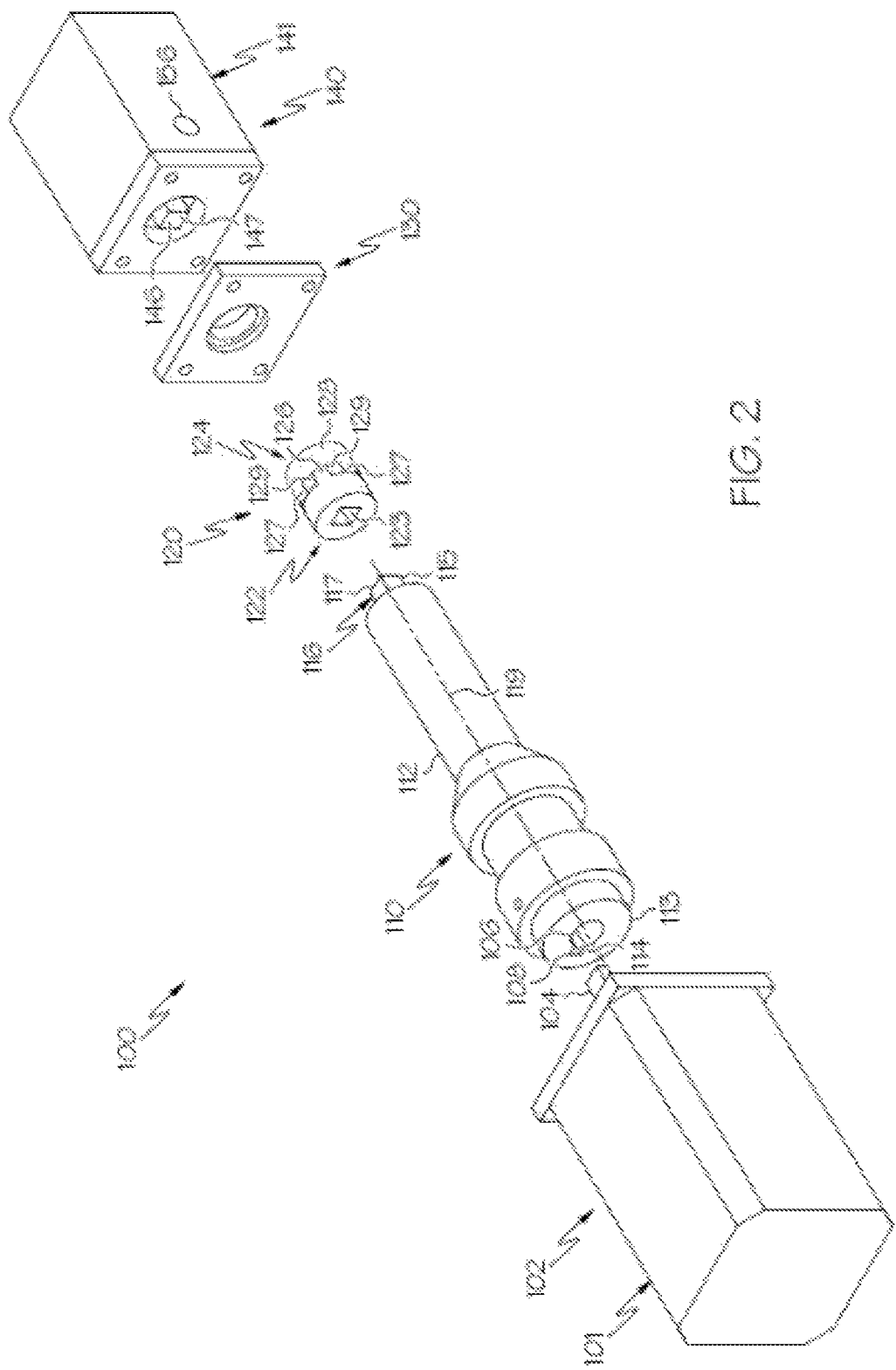
FIG. 2 depicts an exploded perspective view of a flexible shaft assembly according to one or more embodiments shown and described herein.

One embodiment of the flexible shaft assembly 100 is shown in an exploded view in FIG. 2. The flexible shaft assembly 100 includes a stub shaft 110, a flexible coupling 120, and a spacer 130. The stub shaft 110 includes an elongated shaft portion 112, a first stub shaft interface 114 located at a first end 113 of the elongated shaft portion 112, and a second stub shaft interface 116 located at a second end 115 of the elongated shaft portion 112. The first stub shaft interface 114 is configured to couple with an output shaft 104 of the driver 101. The first stub shaft interface 114, as illustrated in FIG. 2, includes a cylindrical opening 106 and an axial keyway 108. A series of set-screws may be provided to secure the first stub shaft interface 114 to the output shaft 104 of the driver 101. While FIG. 2 shows the cylindrical opening 106 and axial keyway 108 for connecting with the output shaft 104, any other suitable connection may be used.

The flexible coupling 120 includes a first hub 122 and a second hub 124. The first hub 122 includes a first coupling interface 123 that is configured to couple with the second stub shaft interface 116 of the stub shaft 110. In the embodiment illustrated in FIG. 2, the second stub shaft interface 116 includes an external spline 117 that has a square-shaped cross-section. The external spline 117 is fitted within the first coupling interface 123 that has a square-shape and extends along a length of the first hub 122 of the flexible coupling 120. While FIG. 2 shows a square-shaped external spline 117 and first coupling interface 123 for connecting the stub shaft 110 with the first hub 122 of the flexible coupling 120, any other suitable connection may be used.

The second hub 124 of the flexible coupling 120 is configured to couple with an input shaft 146 of the driven member 140, here a hydraulic pump 141. The input shaft 146 of the hydraulic pump 141 includes an external spline 147 that has a square-shaped cross-section. The second hub 124 of the flexible coupling 120 includes a second coupling interface 125 that includes a square-shaped opening that extends along a length of the second hub 124. While FIG. 2 shows a square-shaped external spline 147 and a second coupling interface 125 for connecting the second hub 124 of the flexible coupling 120 with the input shaft 146 of the hydraulic pump 141, any other suitable connection may be used.

The first hub 122 and the second hub 124 of the flexible coupling 120 are adjustably connected to one another. The connection between the first hub 122 and the second hub 124 allows the flexible coupling 120 to convey torque from the first hub 122 to the second hub 124, while allowing the first hub 122 and the second hub 124 to maintain an amount of misalignment. Thus, the flexible coupling 120 allows the output shaft 104 of the driver 101 to provide a rotational torque to the input shaft 146 of the driven member 140 even when the output shaft 104 of the driver 101 and the input shaft 146 of the driven member 140 are misaligned.

Figure 5:
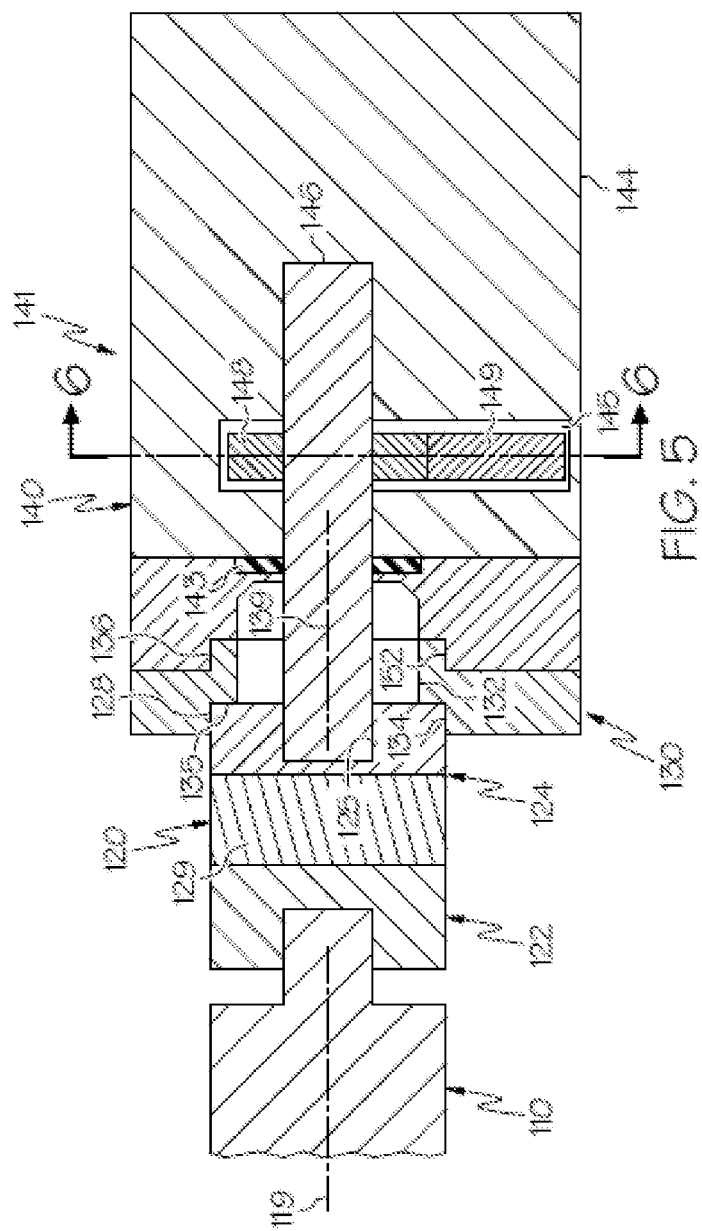
FIG. 5 depicts a sectional view of a flexible shaft assembly according to one or more embodiments shown and described herein.

In the embodiment depicted in FIG. 2, the flexible coupling 120 is a jaw-type coupling. Drive-side jaws 126 extend from the first hub 122 and driven-side jaws 127 extend from the second hub 124. The drive-side jaws 126 and the driven-side jaws 127 each contact a compliant spider element 129, as shown in FIGS. 5 and 7. The compliant spider element 129 allows the first hub 122 to adjust relative to the second hub 124, such that the first hub 122 and the second hub 124 are out of alignment, while continuing to convey torque from the first hub 122 to the second hub 124. Because the drive-side jaws 126 and the driven-side jaws 127 both contact the compliant spider element 129, the drive-side jaws 126 may continue to provide torque to the driven-side jaws 127 as the first hub 122 translates axially away from the second hub 124 (see FIG. 7). Various types of commercially-available flexible couplings may be suitable for use in a flexible shaft assembly 100, for example, bellows couplings, helical couplings, and slit-type couplings. The second hub 124 of the flexible coupling 120 may include an external cylindrical interface 128 that extends around the periphery of the second hub 124.

The flexible shaft assembly 100 also includes a spacer 130, which is shown in more detail in FIGS. 3 and 4. The spacer 130 may include a spacer body 131, a shaft clearance hole 132 that passes through the spacer body 131 and defines a central axis 139, and a cylindrical guide surface 134 that is concentric with the shaft clearance hole 132 and extends along a partial thickness of the spacer body 131. The spacer 130 may also include a travel-limiting surface 135 that extends between the cylindrical guide surface 134 and the shaft clearance hole 132 in a direction orthogonal to the central axis 139 of the shaft clearance hole 132. Additionally, the spacer 130 may include a locating lip 136 that extends from the spacer body 131 along a side of the spacer body 131 opposite the cylindrical guide surface 134. The locating lip 136 may be concentric with the central axis 139 of the shaft clearance hole 132. The spacer 130 may include a plurality of mounting holes 138 through which fasteners may be installed to secure the spacer 130 in position relative to the driven member 140 when assembled.

Referring now to FIG. 5, a portion of the flexible shaft assembly 100 installed with the driven member 140 is depicted. The spacer 130 may be mounted in a fixed position relative to the driven member 140 such that the central axis 139 defined by the shaft clearance hole 132 is aligned with the input shaft 146 of the hydraulic pump 141. The spacer 130 may be configured to mate directly to a face of the hydraulic pump 141. In other embodiments, the spacer 130 may be mounted to other surfaces, for example, surfaces of the robotic arm 92 of FIG. 1, such that the central axis 139 defined by the shaft clearance hole 132 maintains alignment with the input shaft 146 of the hydraulic pump 141.

The spacer 130 is mounted to the hydraulic pump 141 such that the central axis 139 of the shaft clearance hole 132 is concentric with input shaft 146 of the hydraulic pump 141. In this embodiment, the spacer 130 includes the locating lip 136 that extends away from the spacer body 131 and is held within a seating surface 152 of the hydraulic pump 141. The flexible coupling 120 is attached to the input shaft 146 of the hydraulic pump 141. With the second coupling interface 125 mated with the input shaft 146, the external cylindrical interface 128 of the second hub 124 is located inside the cylindrical guide surface 134 of the spacer 130. Additionally, in this embodiment, at least a portion of the second hub 124 contacts the travel-limiting surface 135 of the spacer 130. At the opposite end of the flexible coupling 120, the stub shaft 110 is coupled to the first hub 122. As clearly depicted in FIGS. 5 and 7, the first hub 122 of the flexible coupling 120 is positioned outside the cylindrical guide surface 134 of the spacer 130.

Figure 6:
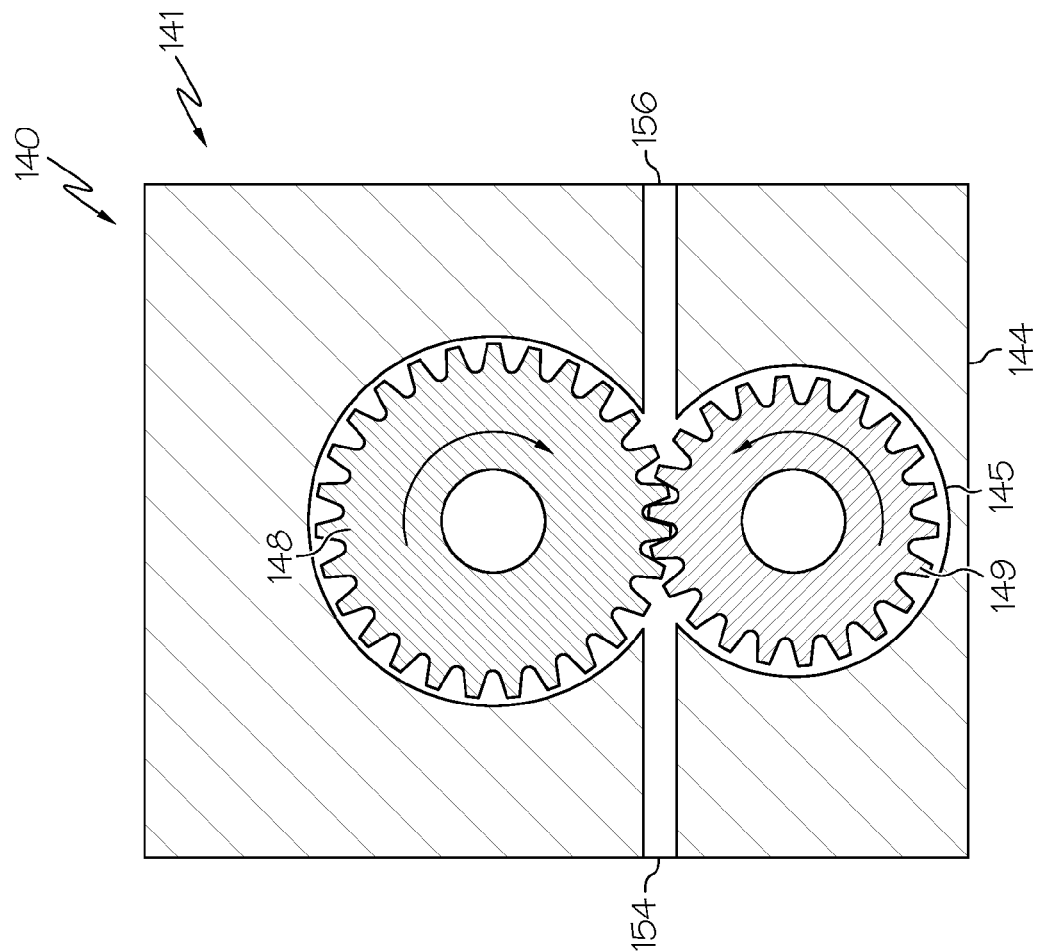
FIG. 6 depicts a sectional view of a flexible shaft assembly along line 6-6 of FIG. 5.

While many types of hydraulic pumps may be used in conjunction with flexible shaft assemblies 100, the hydraulic pump 141 depicted in FIGS. 5 and 6 is a positive-displacement gear pump. The hydraulic pump 141 may be flushable, such that liquids that are displaced by the hydraulic pump 141 can be easily removed. In certain applications, for example, hydraulic pumps 141 used to meter and deliver paint, complete removal of liquids from the hydraulic pump 141 may be desired to facilitate changing from one liquid to another liquid without contamination.

Referring to FIG. 6, the hydraulic pump 141 includes a drive gear 148 and an idler gear 149 that are located in a gear enclosure 145 in the pump housing 144. The drive gear 148 is coupled to the input shaft 146 such that rotation of the input shaft 146 causes the drive gear 148 to rotate. Gear teeth on the drive gear 148 and the idler gear 149 mesh with one another such that the drive gear 148 and the idler gear 149 rotate in a direction opposite to one another. A shaft seal 143 may be positioned along the input shaft 146 and secured to the pump housing 144 to create a fluid-tight seal between the input shaft 146 and the pump housing 144 to prevent liquid from leaking out of the gear enclosure 145. Additionally, support bearings may be included within the pump housing 144 to position the drive gear 148 and the idler gear 149.

Still referring to FIG. 6, as discussed above, rotation of the input shaft 146 causes the drive gear 148 and the idler gear 149 to rotate together in opposite directions. Liquid introduced to the gear enclosure 145 through an inlet port 154 is carried by the gear teeth of the drive gear 148 and the idler gear 149 in the direction of gear rotation towards an output port 156. The rate of flow of the liquid from the inlet port 154 to the outlet port 156 of the hydraulic pump 141 is controlled by the rate of rotation of the drive gear 148 and the idler gear 149, as well as by the clearances between the pump internals, for example, the drive gear 148, the idler gear 149, and the gear enclosure 145 of the pump housing 144.

Referring to FIGS. 5 and 6 together, with the elements of the flexible shaft assembly 100 installed, rotation of the output shaft 104 of the motor 102 (not shown) causes rotation of the stub shaft 110, which, in turn, causes rotation of the flexible coupling 120 and the input shaft 146 of the hydraulic pump 141. Rotation of the input shaft 146 of the hydraulic pump 141 causes the drive gear 148 and the idler gear 149 to rotate within the gear enclosure 145, thereby moving fluid from the input port 154 towards the outlet port 156 of the pump housing 144. Therefore, rotation of the output shaft 104 of the motor 102 controls the amount of liquid the hydraulic pump 141 dispenses, or meters, out of the outlet port 156 of the pump housing 144.

Referring again to FIG. 6, because the rate of displacement of liquid is controlled by the clearances between the pump housing 144 and the drive gear 148 and the idler gear 149, clearance between these components is often small. The clearances between the pump internals are typically made small to maximize the efficiency of the hydraulic pump 141. However, because clearances between the drive gear 148 and the idler gear 149 are small relative to the gear enclosure 145, wear of the components may lead to reduction in efficiency of the hydraulic pump 141.

Application of unwanted forces to the input shaft 146 of the hydraulic pump 141, for example, radial forces other than torque that tends to rotate the input shaft 146, may tend to cause stress and wear on adjacent components of the hydraulic pump 141. In applications where the motor 102 is rigidly connected to the input shaft 146 of the hydraulic pump 141, these unwanted forces may be caused by misalignment between the motor 102 and the input shaft 146 of the hydraulic pump 141. Misalignment may be caused by a parallel offset of the shafts, an angular offset of the shafts, or a combination of both parallel and angular offset of the shafts. Misalignment between the motor 102 and the input shaft 146 may cause the drive gear 148 and/or the idler gear 149 to contact adjacent surfaces of the pump housing 144, causing wear to the one or more of the components and reducing pump efficiency and/or decreasing the life of the shaft seal 143 and any support bearings. Misalignment between the motor 102 and the input shaft 146 may also cause wear between the shaft seal 143 and the input shaft 146, itself, causing leakage from the pump housing 144. Further, in cases of severe misalignment between the motor 102 and the input shaft 146, the misalignment will create an application of bending stress to the input shaft 146, which may cause the input shaft 146 to fail. Additionally, the rotating components of motors may translate axially, or "float," relative to the static components of motors while under operation. This axial float of the output shaft 104 of the motor 102 may force the drive gear 148 to translate in a corresponding direction within the pump housing 144.

Flexible shaft assemblies 100 according to the present disclosure prevent unwanted forces from being introduced to the input shaft 146 of the hydraulic pump 141, thereby reducing wear of the internal components of the hydraulic pump 141. This may extend the useful life of the hydraulic pump 141, as well as decrease the time required to align a hydraulic pump 141 with a motor 102 in the event of a hydraulic pump 141 replacement. As depicted in FIG. 7, the first hub 122 of the flexible coupling 120 adjusts relative to the second hub 124 of the flexible coupling 120 when the elongated shaft axis 119 of the stub shaft 110 is out of alignment with the central axis 139 of the shaft clearance hole 132. Because the external cylindrical interface 128 of the second hub 124 is located inside the cylindrical guide surface 134 of the spacer 130, the cylindrical guide surface 134 limits the misalignment between second hub 124 and the input shaft 146 of the pump housing 144. The spacer 130, though contact between the external cylindrical interface 128 and the cylindrical guide surface 134, induces the flexible coupling 120 to adjust to any misalignment between the elongated shaft axis 119 and the central axis 139, while the spacer 130 absorbs any force due to the misalignment of the elongated shaft axis 119 and the central axis 139. As depicted in FIG. 7, the spacer 130 directs any force due to the misalignment into the pump housing 144. Further, because the stub shaft 110 is coupled to the output shaft 104 of the motor 102 and the second hub 124 of the flexible coupling is coupled to the input shaft 147 of the hydraulic pump 141, the flexible coupling 120 absorbs any misalignment between the output shaft 104 of the motor 102 and the input shaft 147 of the hydraulic pump 141.

Unwanted forces due to the misalignment of the elongated shaft axis 119 of the stub shaft 110 relative to the central axis 139 of the shaft clearance hole 132 are resisted by the spacer 130. Additionally, in embodiments where at least a portion of the second hub 124 contacts the travel-limiting surface 135 of the spacer 130, the travel-limiting surface 135 prevents unwanted force that tends to translate the drive gear 148 relative to the pump housing 144 in a direction along the central axis 139. Forces that tend to translate the drive gear in a direction along the central axis 139 may be caused by axial float of internal components of the motor 102. By resisting the unwanted forces at the spacer 130, forces applied in a direction along the central axis 139 are directed away from the input shaft 147 of the hydraulic pump 141, and into the spacer 130. By directing the force away from the input shaft 147 of the hydraulic pump 141, contact between internal components of the hydraulic pump 141 and/or wear of internal components may be minimized. Thus, the life of the hydraulic pump 141 may be increased.

The flexible coupling 120 may absorb impulse forces, for example, shock, vibration, and/or pulsations of torque that are output by the motor 102. By absorbing impulse forces, the flexible coupling 120 prevents these forces from being input to the input shaft 146 of the hydraulic pump 141, which may increase the life of the components of the hydraulic pump 141.

Further, the use of flexible shaft assemblies 100 may decrease the requirement to align the output shaft 104 of the motor 102 with the input shaft 146 of the hydraulic pump 141. When a rigid connection between the output shaft 104 and the input shaft 146 is used, the output shaft 104 and the input shaft 146 must be aligned to a high precision to avoid introducing unwanted forces into the hydraulic pump 141. Because the flexible shaft assembly 100 is able to minimize the amount of unwanted force from being introduced into the input shaft 146 of the hydraulic pump 141, the precision with which the output shaft 104 and the input shaft 146 must be aligned may be reduced. This decrease in required precision may decrease the time required to replace a hydraulic pump 141.

It should now be understood that flexible shaft assemblies may be used in conjunction with drivers and driven members to minimize the introduction of unwanted forces into the driven members. The flexible shaft assemblies may adjust to accommodate misalignment between the drivers and the driven members as to continue to convey torque, and may absorb unwanted forces due to misalignment. By absorbing unwanted forces, the flexible shaft assemblies may prevent the unwanted force from being introduced to the input shafts of the driven members. Reducing the application of unwanted forces may increase the life of the driven members.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

What is claimed is:

1. A flexible shaft assembly that couples a driver to a driven member for transferring torque to the driven member, the flexible shaft assembly comprising:
    a stub shaft comprising an elongated shaft portion having an elongated shaft axis and including a first stub shaft interface located at a first end of the shaft portion and a second stub shaft interface located at a second end of the shaft portion, the first stub shaft interface couples to the driver and the second stub shaft interface is coupled to a flexible coupling;
    the flexible coupling comprising a first hub that is adjustably connected to a second hub, the first hub comprising a first coupling interface coupled to the second stub shaft interface of the stub shaft and the second hub comprising a second coupling interface that couples to the driven member and an external cylindrical interface; and
    a spacer comprising a spacer body, a shaft clearance hole that passes through the spacer body having a central axis extending therethrough, a cylindrical guide surface concentric with the shaft clearance hole, and a locating lip that is concentric with the shaft clearance hole and extends from the spacer body in a direction opposite to the cylindrical guide surface, wherein the locating lip is held within a seating surface of the driven member,
    wherein at least a portion of the external cylindrical interface of the flexible coupling is located inside the cylindrical guide surface of the spacer, and the first hub of the flexible coupling is positioned outside of the cylindrical guide surface of the spacer and the first hub adjusts relative to the second hub of the flexible coupling when the elongated shaft axis of the stub shaft is out of alignment with the central axis of the shaft clearance hole.

2. The flexible shaft assembly of claim 1, wherein the spacer further comprises a travel-limiting surface extending from the cylindrical guide surface to the shaft clearance hole in a direction orthogonal to the central axis of the shaft clearance hole.

3. The flexible shaft assembly of claim 2, wherein at least a portion of the second hub of the flexible coupling contacts the travel-limiting surface of the spacer.

4. The flexible shaft assembly of claim 2, wherein the cylindrical guide surface and the travel-limiting surface of the spacer are configured to minimize forces other than rotational torque from being applied to an input shaft of the driven member.

5. The flexible shaft assembly of claim 1, wherein the second coupling interface of the stub shaft comprises an external spline that comprises a square-shaped cross-section and the first coupling interface of the flexible coupling comprises a square-shaped opening that extends inside the first hub.

6. The flexible shaft assembly of claim 1, wherein the driver is a motor and the driven member comprises a hydraulic pump.

7. The flexible shaft assembly of claim 6, wherein the hydraulic pump is a flushable gear pump.

8. The flexible shaft assembly of claim 7, wherein the spacer is configured to be statically mounted such that the central axis of the spacer body is aligned with a input shaft of the hydraulic pump.

9. The flexible shaft assembly of claim 1, wherein the spacer is configured to be fixedly mounted to a static portion of the driven member.

10. A flexible shaft assembly that couples a driver to a driven member for transferring torque to the driven member, the flexible shaft assembly comprising:

a stub shaft comprising an elongated shaft portion having an elongated shaft axis and including a first stub shaft interface located at a first end of the shaft portion and a second stub shaft interface located at a second end of the shaft portion, the first stub shaft interface couples to the driver and the second stub shaft interface is coupled to a flexible coupling;

the flexible coupling comprising:
a first hub that is adjustably connected to a second hub, the first hub comprising a first coupling interface coupled to the second stub shaft interface of the stub shaft and the second hub comprising a second coupling interface that couples to the driven member and an external cylindrical interface; and
a jaw coupling comprising a compliant spider element located between driving jaws extending from the first hub and driven jaws extending from the second hub; and a spacer comprising a spacer body, a shaft clearance hole that passes through the spacer body having a central axis extending therethrough, and a cylindrical guide surface concentric with the shaft clearance hole, wherein at least a portion of the external cylindrical interface of the flexible coupling is located inside the cylindrical guide surface of the spacer, and the first hub of the flexible coupling is positioned outside of the cylindrical guide surface of the spacer and the first hub adjusts relative to the second hub of the flexible coupling when the elongated shaft axis of the stub shaft is out of alignment with the central axis of the shaft clearance hole.

11. The flexible shaft assembly of claim 10, wherein the spacer further comprises a travel-limiting surface extending from the cylindrical guide surface to the shaft clearance hole in a direction orthogonal to the central axis of the shaft clearance hole.

12. The flexible shaft assembly of claim 11, wherein at least a portion of the second hub of the flexible coupling contacts the travel-limiting surface of the spacer.

13. The flexible shaft assembly of claim 11, wherein the cylindrical guide surface and the travel-limiting surface of the spacer are configured to minimize forces other than rotational torque from being applied to an input shaft of the driven member.

14. The flexible shaft assembly of claim 10, wherein the second coupling interface of the stub shaft comprises an external spline that comprises a square-shaped cross-section and the first coupling interface of the flexible coupling comprises a square-shaped opening that extends inside the first hub.

15. The flexible shaft assembly of claim 10, wherein the driver is a motor and the driven member comprises a hydraulic pump.

16. The flexible shaft assembly of claim 10, wherein the hydraulic pump is a flushable gear pump.

17. A robotic paint dispensing apparatus, comprising:
a multi-axis robot comprising at least one repositionable arm;
a motor coupled to the at least one repositionable arm of the multi-axis robot, the motor comprising an output shaft;
a stub shaft comprising an elongated shaft portion comprising a first stub shaft interface located at a first end of the shaft portion and a second stub shaft interface located at a second end of the shaft portion, wherein the first stub shaft interface is coupled to the output shaft of the motor;
a flexible coupling comprising a first coupling interface located along a first hub, a second coupling interface located along a second hub, and an external cylindrical interface extending along the second hub, wherein the first coupling interface is coupled to the second stub shaft interface of the stub shaft;
a hydraulic pump coupled to the at least one repositionable arm of the multi-axis robot, the hydraulic pump comprising a pump housing and an input shaft protruding from the pump housing, wherein the input shaft of the hydraulic pump is coupled to the second coupling interface of the flexible coupling; and
a spacer comprising a spacer body, a shaft clearance hole that passes through the spacer body, a cylindrical guide surface concentric with the shaft clearance hole, and a locating lip that is concentric with the shaft clearance hole and extends from the spacer body in a direction opposite to the cylindrical guide surface, wherein the locating lip is held within a seating surface of the hydraulic pump,
wherein the spacer is statically mounted such that cylindrical guide surface is aligned with the input shaft of the hydraulic pump and at least a portion of the external cylindrical interface of the flexible coupling is located inside the cylindrical guide surface of the spacer and the first hub of the flexible coupling is positioned outside of the cylindrical guide surface of the spacer such that the first hub adjusts relative to the second hub of the flexible coupling when the elongated shaft portion of the stub shaft is out of alignment with a central axis of the shaft clearance hole.

18. The robotic paint dispensing apparatus of claim 17, wherein the spacer further comprises a travel-limiting surface extending from the cylindrical guide surface to the shaft clearance hole in a direction orthogonal to the cylindrical guide surface, and at least a portion of the second hub of the flexible coupling contacts the travel-limiting surface.

19. The robotic paint dispensing apparatus of claim 18, wherein the cylindrical guide surface and the travel-limiting surface of the spacer are configured to minimize forces other than rotational torque from being applied to the input shaft of the hydraulic pump.

20. The robotic paint dispensing apparatus of claim 17, wherein the flexible coupling comprises a jaw coupling comprising a compliant spider element located between driving jaws extending from the first hub and driven jaws extending from the second hub.

* * * * *